April 8, 1924.  
M. MARKKULA  
1,489,844  
WEED PULLER AND HAND CULTIVATOR  
Filed April 17, 1923
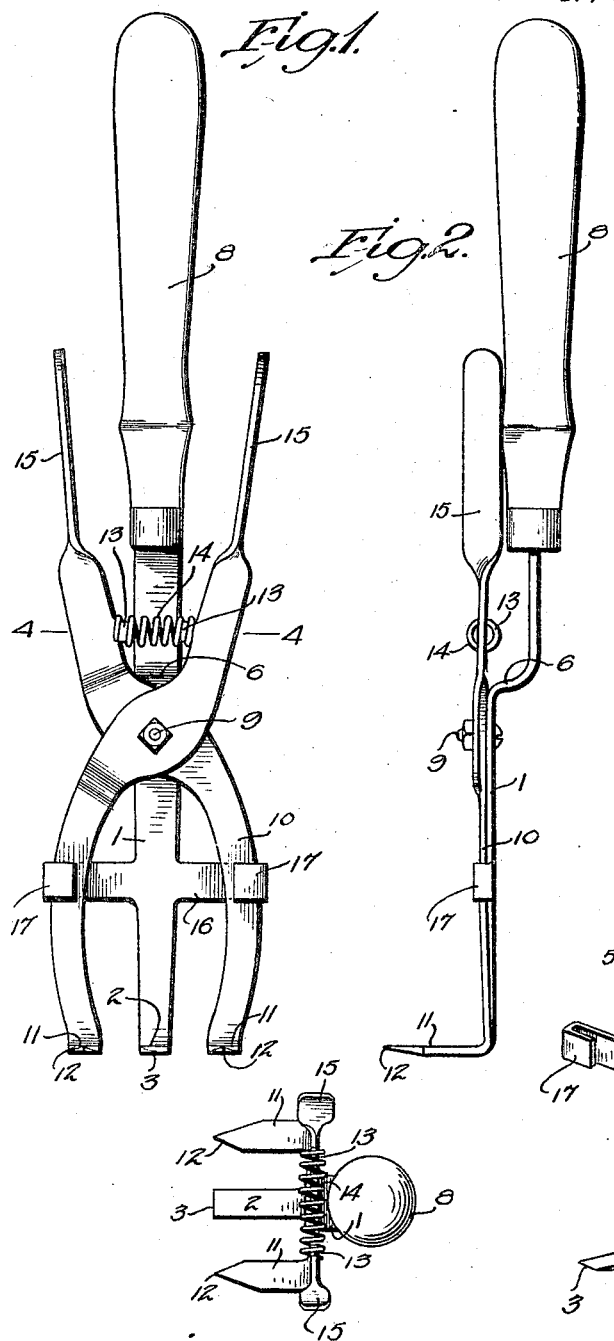
Inventor  
MATT MARKKULA Patented Apr. 8, 1924.

1,489,844

UNITED STATES PATENT OFFICE.

MATT MARKKULA, OF FORT BRAGG, CALIFORNIA.

WEED PULLER AND HAND CULTIVATOR.

Application filed April 17, 1923. Serial No. 632,775.

*To all whom it may concern:*

Be it known that I, MATT MARKKULA, a citizen of the United States, residing at Fort Bragg, in the county of Mendocino and State of California, have invented certain new and useful Improvements in Weed Pullers and Hand Cultivators, of which the following is a specification.

This invention relates to agricultural implements and more particularly to weed pullers.

An object of the invention is to provide a simple hand tool by means of which weeds may be readily removed from the ground.

A further object is to provide a tool having a plurality of prongs, one of which is stationary and the others movable toward the stationary prong to grasp the stem of a weed between them and permit its removal.

In the accompanying drawings, I have shown one embodiment of the invention. In this showing:

Figure 1 is a plan view,

Figure 2 is a side elevation,

Figure 3 is an end elevation,

Figure 4 is a transverse sectional view on line 4—4 of Figure 1, and,

Figure 5 is a perspective view of the stationary prong and its associated parts.

Referring to the drawings, the reference numeral 1 designates a main arm or stem, the outer end of which is extended at right angles, as indicated at 2, and provided with a pointed end 3. The extended portion 2 forms a stationary prong. Intermediate its ends, the arm 1 is provided with a relatively broad portion 4, having an opening 5 for the reception of a pivot pin. Adjacent this opening, the arm is offset, as at 6, and provided with a pointed end 7, adapted to be received in an ordinary wooden handle 8.

The movable arms are mounted on a pivot pin 9 arranged in the opening 5. Each of the arms comprises a curved portion 10 arranged on one side of the arm 1 and having an offset end 11, forming a prong. The end of the prong is sharpened, as at 12. Beyond the pivot, the arms of the movable prongs are extended on the opposite side of the main arm 1. Each of these arms is provided with a lug 13, adapted to receive the end of a coil spring 14, by means of which the prongs are normally retained in spaced position. The upper ends of the arms are arranged at right angles to the body portion to provide gripping members 15.

The main arm 1 is provided with a transverse arm 16 having its ends extended over the body portion, as at 17, and forming stops to limit the outward movement of the arms 10.

The operation of the device will be apparent from the foregoing description. The prongs are inserted in the ground adjacent the weed to be removed and the movable prongs are then moved toward the stationary prong and grasp the stem of the weed and permit its removal.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a device of the character described, a handle, a shank mounted in said handle, a prong formed on the end of said shank, a pair of cross arms pivotally mounted on said shank, prongs formed on the outer ends of said arms, and gripping members formed on the inner end of said arms and arranged adjacent said handle.

2. In a device of the character described, a handle, a shank mounted in said handle, a prong formed on the end of said shank, a pair of cross arms pivotally mounted on said shank, prongs formed on the outer ends of said arms, gripping members formed on the inner end of said arms and arranged adjacent said handle, and means for normally retaining said arms in spaced position.

3. In a device of the character described, a handle, a shank mounted in said handle, a prong formed on the end of said shank, a pair of cross arms pivotally mounted on said shank, prongs formed on the outer ends of said arms, gripping members formed on the inner end of said arms and arranged adjacent said handle, and a spring arranged between said arms to normally retain them in spaced relation.

4. In a device of the character described, a handle, a shank mounted in said handle, a prong formed on the outer end of said shank, a plurality of arms pivotally mounted on said shank, prongs arranged on the outer end of said arms and disposed adjacent said first prong, means for normally retaining said prongs in spaced relation, a transverse member carried by said shank, and stops formed on said transverse member to limit the movement of said arms.

In testimony whereof I affix my signature in presence of two witnesses.

MATT MARKKULA.

Witnesses:
J. A. PETTIS,
MATI PUTOLA.